(12) United States Patent
Schmitt et al.

(10) Patent No.: US 8,246,054 B2
(45) Date of Patent: Aug. 21, 2012

(54) FLAT METAL GASKETS

(75) Inventors: Klaus Schmitt, Grunebach (DE);
Dietmar Buchen, Köln (DE); Klaus Cierockl, Slegen (DE); Ralf Flemming, Langenbach (DE); Hubert Koehler, Betzdorf (DE)

(73) Assignee: Federal-Mogul Sealing Systems GmbH, Herdorf (DE)

( * ) Notice: Subject to any disclaimer, the term of this patent is extended or adjusted under 35 U.S.C. 154(b) by 617 days.

(21) Appl. No.: 12/066,699

(22) PCT Filed: Jun. 13, 2006

(86) PCT No.: PCT/EP2006/005674
§ 371 (c)(1),
(2), (4) Date: Mar. 13, 2008

(87) PCT Pub. No.: WO2007/031127
PCT Pub. Date: Mar. 22, 2007

(65) Prior Publication Data
US 2008/0185791 A1 Aug. 7, 2008

(30) Foreign Application Priority Data
Sep. 13, 2005 (DE) .......................... 10 2005 043 630

(51) Int. Cl.
*F16J 15/08* (2006.01)
(52) U.S. Cl. ........................................................ 277/593
(58) Field of Classification Search .................. 277/590, 277/591, 593, 594, 598
See application file for complete search history.

(56) References Cited

U.S. PATENT DOCUMENTS

| | | | |
|---|---|---|---|
| 6,027,124 A | 2/2000 | Ishida et al. | |
| 6,182,976 B1 * | 2/2001 | Maekawa et al. | 277/593 |
| 6,779,801 B2 * | 8/2004 | Grant-Acquah et al. | 277/592 |
| 2002/0135135 A1 | 9/2002 | Fujino et al. | |
| 2004/0262850 A1 | 12/2004 | Matsushita | |
| 2005/0046116 A1 * | 3/2005 | Kebaili | 277/591 |
| 2005/0189724 A1 | 9/2005 | Schmitz | |
| 2007/0090607 A1 * | 4/2007 | Ueta et al. | 277/593 |

FOREIGN PATENT DOCUMENTS

| | | |
|---|---|---|
| DE | 100 53 556 A1 | 5/2002 |
| EP | 1 243 820 A | 9/2002 |
| WO | WO03010450 A1 * | 6/2003 |

* cited by examiner

*Primary Examiner* — Gilbert Lee
(74) *Attorney, Agent, or Firm* — Robert L. Stearns; Dickinson Wright, PLLC

(57) ABSTRACT

The present invention relates to cylinder head gaskets on internal combustion engines, with at least three layers, namely a mid-layer, a function layer and a layer of a compression limiter. The mid-layer is arranged between the function layer and the compression limiter. The mid-layer has at least two essentially round fixing openings, outside a sealing region. The compression limiter is beaded around the edges of the fixing openings in the region thereof, and in this way fixes the compression limiter to the mid-layer. The function layer has recesses in the region of the fixing openings of the mid-layer, in order to accommodate the beaded region of the compression limiter, without increasing the total thickness of the gasket in the region of the fixing of the compression limiter.

10 Claims, 2 Drawing Sheets

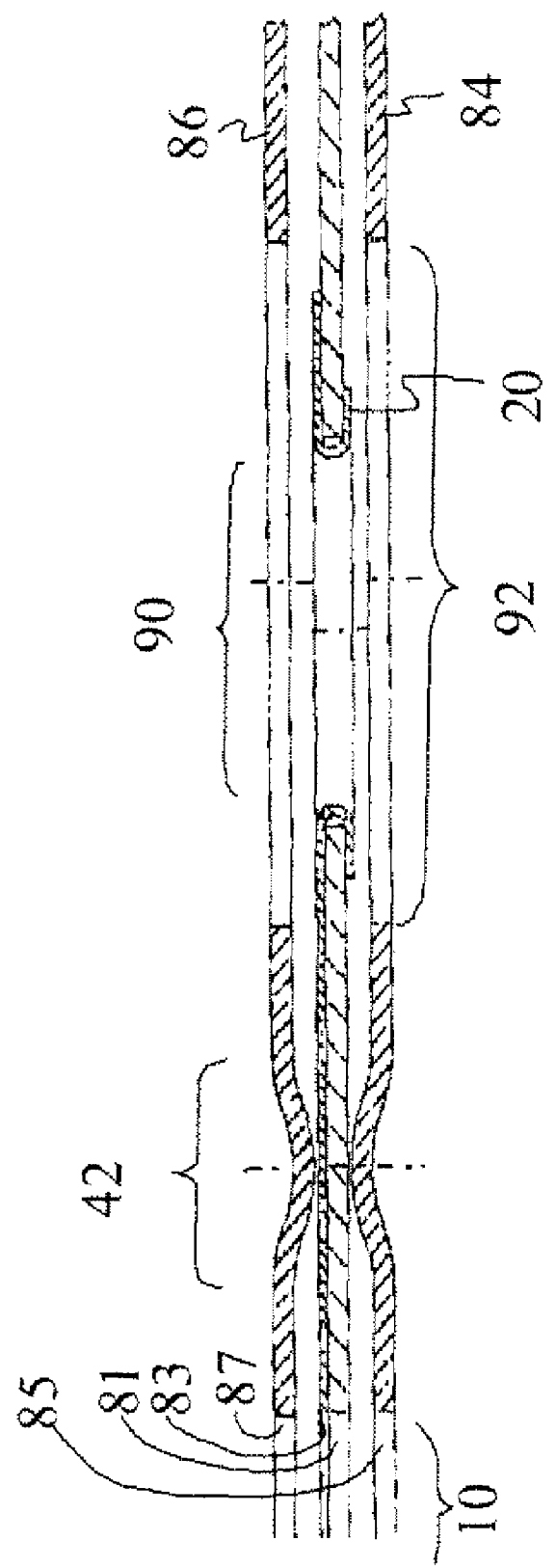

FLAT METAL GASKETS

BACKGROUND OF THE INVENTION

1. Technical Field

Figure 1:
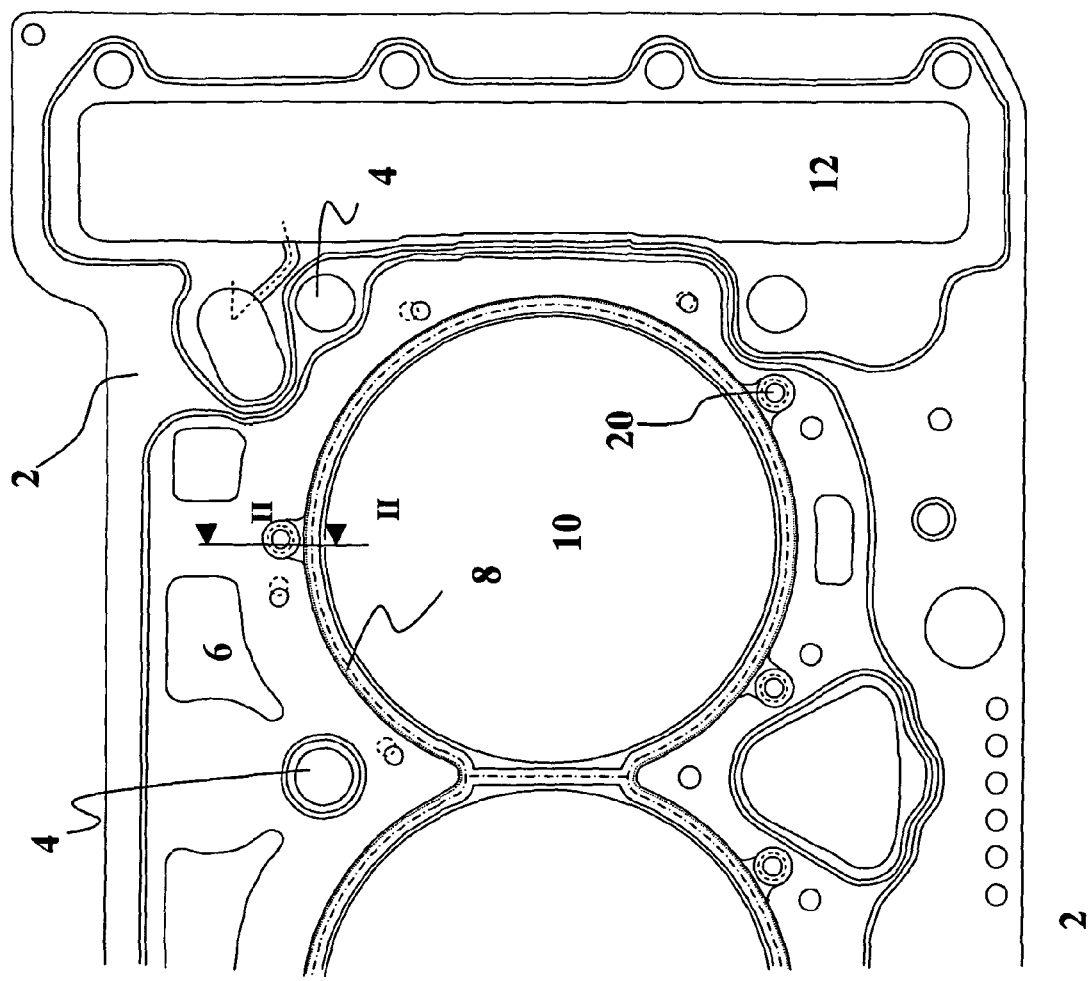

The present invention relates to flat metallic gaskets, such as, for example, cylinder head gaskets on internal combustion engines.

2. Related Art

After the use of multilayer flat metallic gaskets as a replacement for cardboard and fabric-based gaskets became known in the art, the widest range of embodiments have become known.

As the present state of the art, explicit reference is made to the document WO 03010450, which discloses a two-layer or multi-layer flat metallic gasket, which has an inlaid compression limiter in the region of the combustion chamber. In WO 03010450, the compression limiter lies in the plane of the mid-layer of the flat metallic gasket. The compression limiter is fixed in the flat metallic gasket by means of hollow rivets, wherein one annular segment of the each of the hollow rivets surrounds the compression limiter and another annular segment of each of the hollow rivets surrounds the mid-layer of the flat gasket. The principle is most clearly seen for example in the mounting of "floating" brake discs, such as are known in motor cycles. Another way of fixing compression limiters to flat metallic gaskets is known from for example American patent U.S. Pat. No. 6,027,124. This document discloses a means of fixing compression limiters to a flat metallic gasket based on lugs. In this method, lugs which are formed from the compression limiter are pushed through slots in the flat metallic gasket, so that the compression limiter is fixed to the flat metallic gasket with a positive fitting.

Also known is the fixing of compression limiters, stopper coatings or stopper layers by means of welding methods, such as, for example laser-welding, to other sealing layers.

Stopper layers in this context are used, especially in cylinder head gaskets, to increase the compressive pressure in the region around the combustion chamber, to allow the combustion chamber to be reliably sealed off. Cylinder head gaskets often have other sealing regions as well, in order to seal, for example, coolant-water lines or oil lines, which are passed from the engine block to the cylinder head through the cylinder head gasket.

SUMMARY OF THE INVENTION

The problem addressed by the present invention is that of mounting or connecting compression limiters, stopper layers or stopper collar plates on to other layers of a flat metallic gasket such as, for example, a cylinder head gasket, without having to resort to expensive methods such as, for example, laser welding.

The problem addressed by the present invention is solved by a flat gasket with at least three layers. These at least three layers comprise respectively at least one mid-layer, one function layer and a layer of a compression limiter. The mid-layer is arranged between the function layer and the compression limiter. The mid-layer has at least two essentially round fixing openings, outside a sealing region, in order to fix the compression limiter to the mid-layer. The compression limiter is beaded around the edges of the fixing openings in the region thereof, whereby the compression limiter is fixed to the mid-layer. The function layer comprises recesses in the region of the fixing openings of the mid-layer and of the surrounding beading. The recess can accommodate the beaded region of the compression limiter and guarantee that the flat gasket comprises no regions with more than three layers. By means of this construction, the total thickness of the gasket in the region of the fixing of the compression limiter can be kept small, so that the functioning of the flat gasket, in particular the concentration of the compression on to the region of the flat seal with the compression limiter, is maintained.

The stopper or compression limiter can therefore, due to the beading, be connected with a positive fit to the mid-layer or spacing layer. The use of a complicated and expensive laser welding method can be avoided.

The beading thus has the effect of a hollow rivet, which is formed from the compression limiter as a single piece. This beading can be formed for example from an eyelet, which is enlarged, expanded, bent round and pressed flat. As the beading and the fixing lie outside the sealing region of the flat gasket, the beading can even have cracks or ridges, without adverse effects on the functioning of the flat gasket. The beading serves only to fix the compression limiter, and has no sealing properties.

Preferably, the thickness of the function layer is at least as great as that of the compression limiter. It can thus be guaranteed that (in the compressed state) the stack comprising the function layer, mid-layer and compression limiter is always higher than the stack comprising compression limiter, mid-layer and beaded compression limiter. In fact it is also conceivable that the function layer could be somewhat thinner than the compression limiter, since the thickness of the compression limiter is slightly reduced by the surrounding beading.

Preferably, the diameter of the fixing holes in the mid-layer corresponds to at least 9 times the thickness of the mid-layer. In this embodiment, the compression limiter (which is possibly embodied thinner than the mid-layer) can be passed through the fixing holes, in order to be beaded on the other side of the mid-layer.

In a preferred embodiment of the flat gasket, the diameter of the recesses in the mid-layer is at least 1.5 times greater than the diameter of the fixing holes. It can thus be guaranteed that the beading can be accommodated in the recess. It is also possible to give the recesses an oval or oval-round shape, in order to allow the function layers to give way, due to beads being compressed together and/or due to thermal expansion, and move along the sealing gap to be sealed.

Advantageously, the function layer is a first function layer. The flat gasket comprises in this embodiment a second function layer, which is arranged on the mid-layer, facing the first function layer. This produces a structure with four layers, wherein the mid-layer and the compression limiter are located between the function layers.

Preferably, at least one of the function layers is provided with at least one coating of an elastomer material. The coating can serve, for example, to reinforce coolant-water and/or oil feeds, or water- and/or oil-sealing regions.

Preferably the function layers comprise respectively at least one layer of chrome-nickel spring steel. The function layers can be thereby provided with half- and full-beads, in order to allow these regions to be better sealed.

It is also preferable to produce the mid-layer from spring steel and to provide it with additional beads, and optionally also with coatings. In one embodiment the gasket is provided with three layers, wherein the mid-layer serves as a second function layer made of spring steel.

Preferably, the function layers have half- and full-beads. Full and half-beads, as well as providing a seal, also help to simplify the assembly of, for example, a cylinder head gasket.

The flat gasket is advantageously a cylinder head gasket with combustion chamber sealing holes.

The mid-layer, the first and/or second function layer and the compression limiter (or the layer of a compression limiter) preferably lie on top of one another in the region of the combustion chamber holes, wherein they form a part of the combustion chamber with one side surface each. In this embodiment the compression limiter is not beaded in the region of the combustion chamber, but the individual layers lie on top of each other in a sandwich arrangement in the region of the combustion chamber.

The cylinder head gasket is preferably one cylinder head gasket of a multi-piston engine, wherein the compression limiter is embodied as a "stopper collar plate". The compression limiter in this arrangement (with the exception of the beadings for fixing) extends only in the region of the combustion chambers, and has essentially a shape of a figure of 8, or a double-eight shape, which are connected together at the places where the individual circles (or combustion chambers) touch each other. This structure is also provided with fixing eyes.

THE DRAWINGS

FIGS. 1 and 2 show respectively a top-view and a cross-section through a cylinder head gasket according to the invention.

DETAILED DESCRIPTION

FIG. 1 shows a section of a cylinder head gasket according to the invention. This cylinder head gasket 2 is provided with holes 4 for cylinder head screws. Some of the holes for cylinder head screws are provided with beads for sealing. The cylinder head gasket is also provided with holes 6 for coolant water. Around the combustion chambers 10 the compression limiter 8 can be identified, which is shown fixed to the fixing holes around the mid-layer with beadings 20. The recess 12 in the gasket serves to accommodate a (e.g. chain-) drive for an overhead camshaft. FIG. 2 shows a cross-section through the entire cylinder head gasket along the line II-II of FIG. 1. The stopper is constructed as a collar plate, and fixed to the fixing holes 90 on the spacing layer (or mid-layer). At the point at which the compression limiter layer is beaded around the fixing holes of the mid-layer, the outer function layers (i.e. the first function layer 84 and the second function layer 86) are provided with recesses 92, the dimensions of which are larger than the holes for the beading, or are larger than the outer diameter of the beading.

On the combustion chamber, the edge 81 of the mid-layer, the edge 83 of the compression limiter, the edge 85 of the first function layer and the edge 87 of the second function layer respectively, are positioned on top of one another in a sandwich arrangement. The cylinder head gasket is not provided with a beading enclosing the combustion chamber.

The function layers 84 and 86 are fixed to the mid-layer by for example welded joints. At the point 42 the function layers 84 and 86 are provided with beads in the sealing region.

The invention claimed is:

1. A cylinder head gasket, comprising:
    a functional layer having at least one combustion chamber opening and a sealing bead embossment encircling said combustion chamber opening;
    a mid-layer having at least one combustion chamber opening and at least two fixing openings spaced from said at least one combustion opening of said mid layer;
    a compression limiter layer disposed on one side of said mid layer and sandwiched between said mid-layer and said functional layer and extending across said sealing bead embossment of said functional layer, said compression limiter including at least one combustion opening that is aligned with said at least one combustion openings of said functional layer and of said mid-layer; and
    wherein said compression limiter layer includes at least two eyelet portions that extend into each of said respective fixing openings and wrap around to an opposite surface of said mid-layer so as to line said fixing openings and fix said compression limiter layer to said mid-layer, and further wherein said functional layer includes at least two recesses aligned with said respective fixing openings and eyelets to accommodate said eyelets of said compression limiter without increasing the total thickness of said gasket in the region of said eyelets.

2. The cylinder head gasket according to claim 1, wherein the function layer has a material thickness that is at least as great as that of the compression limiter.

3. The cylinder head gasket according to claim 1, wherein the fixing openings in the mid-layer have a diameter that corresponds to at least 9 times the thickness of the mid-layer.

4. The cylinder head gasket according to claim 3, wherein the recesses in the mid-layer have a diameter that is at least 1.5 times greater than the diameter of the fixing openings.

5. The cylinder head gasket according to claim 1, wherein the function layer is a first function layer, including a second function layer, which is arranged on the mid-layer, facing the first function layer.

6. The cylinder head gasket according to claim 5, wherein the function layers respectively comprise at least one layer of chrome-nickel spring steel.

7. The cylinder head gasket according to claim 5, wherein the function layers have half-beads and full-beads.

8. The cylinder head gasket according to claim 5, wherein the mid-layer, and at least the first or second function layer lays on top of one another in the region of the combustion chamber holes, and with one side surface forming a part of the combustion chamber.

9. The cylinder head gasket according to claim 1, wherein the function layer is provided with at least one coating of an elastomer material.

10. The cylinder head gasket according to claim 1, wherein the cylinder head gasket is a cylinder head gasket for a multi-piston engine, wherein the compression limiter is embodied as a stopper collar plate.

* * * * *